United States Patent
Webber et al.

(10) Patent No.: US 12,036,087 B2
(45) Date of Patent: *Jul. 16, 2024

(54) DENTAL ATTACHMENT PLACEMENT APPARATUSES AND SYSTEMS

(71) Applicant: Align Technology, Inc., San Jose, CA (US)

(72) Inventors: Peter Webber, Redwood City, CA (US); Ryan Kimura, San Jose, CA (US); Chunhua Li, Cupertino, CA (US); Srinivas Kaza, Mountain View, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,195

(22) Filed: Feb. 14, 2023

(65) Prior Publication Data
US 2023/0190416 A1 Jun. 22, 2023

Related U.S. Application Data

(63) Continuation of application No. 14/963,527, filed on Dec. 9, 2015, now Pat. No. 11,596,502.

(51) Int. Cl.
*A61C 7/00* (2006.01)
*A61C 7/08* (2006.01)
(Continued)

(52) U.S. Cl.
CPC .............. *A61C 7/146* (2013.01); *A61C 7/002* (2013.01); *A61C 7/08* (2013.01); *B29C 64/40* (2017.08);
(Continued)

(58) Field of Classification Search
CPC ...................................................... A61C 7/146
See application file for complete search history.

(56) References Cited

U.S. PATENT DOCUMENTS 5,176,517 A * 1/1993 Truax ................. A61C 7/00
433/180
5,575,649 A 11/1996 Lee
(Continued)

OTHER PUBLICATIONS

Merriam Webster; (Definition); Disintegrate; 7 pages; retrived from the internet; https://www.merriam-webster.com/dictionary/disintegrate) on Oct. 16, 2023.
(Continued)

*Primary Examiner* — Heidi M Eide
(74) *Attorney, Agent, or Firm* — Shay Glenn LLP

(57) ABSTRACT

Dental attachment placement apparatuses and related systems. An apparatus may include a body having attachments. The attachments, when worn at specified locations on the patient's dentition, may engage with one or more aligners to direct repositioning forces from the aligner(s) to the patient's dentition. The body of the apparatus may have contoured surfaces shaped in accordance with corresponding surfaces of the patient's teeth. The apparatus may also include supports extending from body and that support a corresponding attachment entirely within a corresponding aperture of the apparatus. The supports may include breakable regions to facilitate removal of the attachments from the body.

22 Claims, 9 Drawing Sheets

(51) Int. Cl.
*A61C 7/14* (2006.01)
*B29C 64/40* (2017.01)
*B33Y 10/00* (2015.01)
*B33Y 50/02* (2015.01)
*B33Y 80/00* (2015.01)
*A61C 13/00* (2006.01)
*B29L 31/00* (2006.01)

(52) U.S. Cl.
CPC .............. *B33Y 10/00* (2014.12); *B33Y 50/02* (2014.12); *B33Y 80/00* (2014.12); *A61C 13/0013* (2013.01); *B29L 2031/7536* (2013.01)

(56) References Cited

U.S. PATENT DOCUMENTS

| | | | |
|---|---|---|---|
| 5,820,368 A | 10/1998 | Wolk | |
| 6,386,864 B1 | 5/2002 | Kuo | |
| 6,783,604 B2 | 8/2004 | Tricca | |
| 6,790,035 B2 | 9/2004 | Tricca et al. | |
| 6,947,038 B1 | 9/2005 | Anh et al. | |
| 7,104,792 B2 | 9/2006 | Taub et al. | |
| 7,160,107 B2 | 1/2007 | Kopelman et al. | |
| 7,448,514 B2 | 11/2008 | Wen | |
| 7,600,999 B2 | 10/2009 | Knopp | |
| 7,766,658 B2 | 8/2010 | Tricca et al. | |
| 7,771,195 B2 | 8/2010 | Knopp et al. | |
| 7,871,269 B2 | 1/2011 | Wu et al. | |
| 7,883,334 B2 | 2/2011 | Li et al. | |
| 7,914,283 B2 | 3/2011 | Kuo | |
| 8,235,715 B2 | 8/2012 | Kuo | |
| 8,337,199 B2 | 12/2012 | Wen | |
| 8,401,686 B2 | 3/2013 | Moss et al. | |
| 8,562,337 B2 | 10/2013 | Kuo et al. | |
| 8,684,729 B2 | 4/2014 | Wen | |
| 8,758,009 B2 | 6/2014 | Chen et al. | |
| 9,119,691 B2 | 9/2015 | Namiranian et al. | |
| 9,326,831 B2 | 5/2016 | Cheang | |
| 9,655,691 B2 | 5/2017 | Li et al. | |
| 9,700,385 B2 | 7/2017 | Webber | |
| 9,844,424 B2 | 12/2017 | Wu et al. | |
| 10,045,835 B2 | 8/2018 | Boronkay et al. | |
| 10,111,730 B2 | 10/2018 | Webber et al. | |
| 10,150,244 B2 | 12/2018 | Sato et al. | |
| 10,201,409 B2 | 2/2019 | Mason et al. | |
| 10,213,277 B2 | 2/2019 | Webber et al. | |
| 10,363,116 B2 | 7/2019 | Boronkay | |
| D865,180 S | 10/2019 | Bauer et al. | |
| 10,463,452 B2 | 11/2019 | Matov et al. | |
| 10,492,888 B2 | 12/2019 | Chen et al. | |
| 10,517,701 B2 | 12/2019 | Boronkay | |
| 10,537,463 B2 | 1/2020 | Kopelman | |
| 10,555,792 B2 | 2/2020 | Kopelman et al. | |
| 10,588,776 B2 | 3/2020 | Cam et al. | |
| 10,743,964 B2 | 8/2020 | Wu et al. | |
| 10,758,323 B2 | 9/2020 | Kopelman | |
| 10,781,274 B2 | 9/2020 | Liska et al. | |
| 10,881,487 B2 | 1/2021 | Cam et al. | |
| 10,912,629 B2 | 2/2021 | Tanugula et al. | |
| 11,154,382 B2 | 10/2021 | Kopelman et al. | |
| 11,166,788 B2 | 11/2021 | Webber | |
| 11,174,338 B2 | 11/2021 | Liska et al. | |
| 11,259,896 B2 | 3/2022 | Matov et al. | |
| 11,278,375 B2 | 3/2022 | Wang et al. | |
| 11,318,667 B2 | 5/2022 | Mojdeh et al. | |
| 11,331,166 B2 | 5/2022 | Morton et al. | |
| 11,471,253 B2 | 10/2022 | Venkatasanthanam et al. | |
| 11,497,586 B2 | 11/2022 | Kopelman | |
| 11,504,214 B2 | 11/2022 | Wu et al. | |
| 11,523,881 B2 | 12/2022 | Wang et al. | |
| 11,564,777 B2 | 1/2023 | Kopelman et al. | |
| 11,571,278 B2 | 2/2023 | Kopelman et al. | |
| 11,571,279 B2 | 2/2023 | Wang et al. | |
| 11,589,955 B2 | 2/2023 | Medvinskaya et al. | |
| 11,596,502 B2 | 3/2023 | Webber et al. | |
| 11,602,414 B2 | 3/2023 | Sato et al. | |
| 11,642,194 B2 | 5/2023 | Boronkay et al. | |
| 11,642,198 B2 | 5/2023 | Kopelman et al. | |
| 11,666,415 B2 | 6/2023 | Wang et al. | |
| 2001/0002310 A1* | 5/2001 | Chishti | A61B 6/466 433/213 |
| 2003/0207224 A1* | 11/2003 | Lotte | A61C 7/08 433/6 |
| 2004/0166462 A1 | 8/2004 | Phan et al. | |
| 2005/0014105 A1 | 1/2005 | Abolfathi et al. | |
| 2005/0244768 A1 | 11/2005 | Taub et al. | |
| 2006/0019218 A1 | 1/2006 | Kuo | |
| 2006/0040235 A1 | 2/2006 | Davis | |
| 2006/0078841 A1 | 4/2006 | Desimone et al. | |
| 2006/0093984 A1* | 5/2006 | Rosenberg | A61C 7/145 433/18 |
| 2006/0199142 A1 | 9/2006 | Liu et al. | |
| 2007/0190476 A1 | 8/2007 | Dellinger | |
| 2008/0160473 A1 | 7/2008 | Li et al. | |
| 2008/0227050 A1* | 9/2008 | Marshall | A61C 7/146 433/24 |
| 2008/0286716 A1 | 11/2008 | Sherwood | |
| 2008/0286717 A1 | 11/2008 | Sherwood | |
| 2009/0280450 A1 | 11/2009 | Kuo | |
| 2010/0055635 A1 | 3/2010 | Kakavand | |
| 2010/0129763 A1 | 5/2010 | Kuo | |
| 2013/0095446 A1* | 4/2013 | Andreiko | A61C 7/08 128/848 |
| 2014/0051039 A1 | 2/2014 | Jensen | |
| 2014/0067334 A1 | 3/2014 | Kuo | |
| 2015/0064641 A1* | 3/2015 | Gardner | A61C 9/004 700/98 |
| 2015/0216626 A1* | 8/2015 | Ranjbar | A61C 7/08 433/24 |
| 2016/0193014 A1 | 7/2016 | Morton et al. | |
| 2016/0318247 A1 | 11/2016 | Schlachter | |
| 2016/0346063 A1* | 12/2016 | Schulhof | A61C 7/002 |
| 2016/0346064 A1 | 12/2016 | Schulhof et al. | |
| 2017/0007359 A1 | 1/2017 | Kopelman et al. | |
| 2017/0065373 A1* | 3/2017 | Martz | A61C 7/002 |
| 2019/0000592 A1 | 1/2019 | Cam et al. | |
| 2019/0000593 A1 | 1/2019 | Cam et al. | |
| 2019/0125497 A1 | 5/2019 | Derakhshan et al. | |
| 2019/0239983 A1 | 8/2019 | Matty | |
| 2019/0262101 A1 | 8/2019 | Shanjani et al. | |
| 2020/0000553 A1 | 1/2020 | Makarenkova et al. | |
| 2020/0155276 A1 | 5/2020 | Cam et al. | |
| 2020/0188062 A1 | 6/2020 | Kopelman et al. | |
| 2020/0214598 A1 | 7/2020 | Li et al. | |
| 2021/0147672 A1 | 5/2021 | Cole et al. | |

OTHER PUBLICATIONS

Merriam Webster; (Definition); Integral; 7 pages; retrived from the internet (https://www.merriam-webster.com/dictionary/integral) on Oct. 16, 2023.

* cited by examiner

DENTAL ATTACHMENT PLACEMENT APPARATUSES AND SYSTEMS

CLAIM OF PRIORITY

This application is a continuation of U.S. patent application Ser. No. 14/963,527, filed Dec. 9, 2015, titled "DENTAL ATTACHMENT PLACEMENT STRUCTURE," now U.S. Patent Application Publication No. 2017/0165032, which is herein incorporated by reference in its entirety.

BACKGROUND

The present disclosure provides methods, computing device readable medium, devices, and systems that utilize dental attachment placement structures prior to or during dental treatment. Dental treatments involve restorative and/or orthodontic procedures to improve the quality of life of a patient.

For example, restorative procedures may be designed to implant a dental prosthesis (e.g., a crown, bridge, inlay, onlay, veneer, etc.) intraorally in a patient. Orthodontic procedures may include repositioning misaligned teeth and/or changing bite configurations for improved cosmetic appearance and/or dental function. Orthodontic repositioning can be accomplished, for example, by applying controlled forces to one or more teeth or a jaw of a patient over a period of time.

As an example, orthodontic repositioning may be provided through a dental process that uses positioning appliances for realigning teeth. Such appliances may utilize a shell of material having resilient properties, referred to as an "aligner," that generally conforms to a patient's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement. Appliances can also be used for other dental conditions, such as application of medications, appliances to help with sleep apnea, and other issues.

Attachments are affixed to the one or more teeth of the patient (typically with an adhesive material, such as an attachment composite material) or directly cured to the tooth. These attachments interact with surfaces on the appliance to impart forces on one or more teeth.

Such systems typically utilize a set of appliances that can be used serially such that, as the teeth move, a new appliance from the set can be implemented to further move the teeth without having to take a new impression of the patient's teeth at every increment of tooth movement in order to make each successive appliance. The same attachments may be utilized with successive appliances or attachments may be added, removed, or replaced with other attachment shapes that may impart different force characteristics than a previous appliance and attachment combination (i.e., appliance and one or more attachments).

Currently, attachments can be formed by hand by a treatment professional (e.g., a doctor or assistant). In this process, a treatment professional selects an attachment material to be used and inserts the material into a well, formed in a sheet of material, to the desired exterior shape of the attachment is provided to the treatment professional and the mixed attachment material is pushed into the well to form the attachment based on the shape of the well.

The attachment is then removed from the well and then put on a tooth and cured. The mixing of the attachment material and amount of attachment composite put into attachment wells on templates are uncontrolled, and therefore errors can occur.

The absolute position of the attachment on the tooth is also subject to user error. When this occurs, the mismatch between the position and/or orientation of the attachment in relation to a contact surface on the appliance, may make using the appliance difficult or impossible and/or make the appliance less effective (reduction of one or more forces being applied by the combination of the attachment and appliance) or provide an incorrect effect (location and/or orientation of the attachment provides different force characteristics than was intended).

Accordingly, the positioning, orientation, and securing of attachments is typically done by a treatment professional at a dentist or orthodontist's office. However, treatment professionals can make one or more errors when mixing, forming, positioning, orienting, or securing one or more of the attachments and as such, the appliance and attachment combination may not fit together correctly or impart the correct one or more forces.

DETAILED DESCRIPTION

Figure 1A:
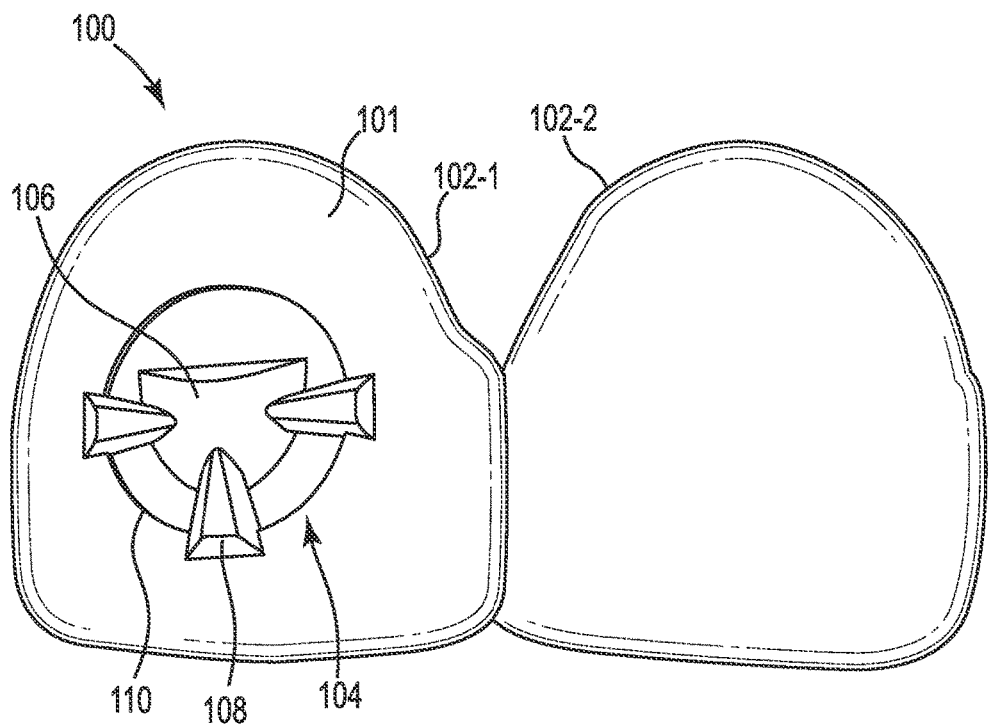
FIG. 1A illustrates a front view of a dental attachment placement structure for placement of an attachment according to a number of embodiments of the present disclosure.

The present disclosure provides methods, computing device readable medium, devices, and systems having a dental attachment placement structure. Such solutions should make mixing, forming, positioning, orienting, and securing attachments easier and quicker, and can make the patient's experience better than use of past procedures.

One dental attachment placement apparatus includes a body having an attachment placement surface that is to be placed on an attachment affixing surface of a tooth and wherein the attachment placement surface includes a portion that is shaped to allow placement of an attachment at a particular position on the affixing surface of the tooth and a portion of the body having a contour that is shaped to correspond with a contour of an alignment surface of a tooth and when the contour of the body and the corresponding contour is aligned, the attachment is located at the particular position and can be secured to the affixing surface of the tooth.

In the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, the designators "M", "N", "P", "R", "S", "T", and "V", particularly with respect to reference numerals in the drawings, indicate that any number of the particular feature so designated can be included. As used herein, "a number of" a particular thing can refer to one or more of such things (e.g., a number of teeth can refer to one or more teeth).

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1A, and a similar element may be referenced as 301 in FIG. 3A.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure, and should not be taken in a limiting sense.

FIG. 1A illustrates a front view of a dental attachment placement structure for placement of an attachment according to a number of embodiments of the present disclosure. In the embodiment of FIG. 1A, the apparatus 100 includes a body 101 having at least one surface shaped to conform to one or more of the contours of an exterior surface of a tooth. In the case of the embodiment of FIG. 1A, the body has multiple surfaces, (inner surfaces of portions 102-1 and 102-2), each shaped to conform to the multiple contours of an exterior surface of a tooth, and other surfaces will be discussed in more detail in FIG. 1B.

The body 101 also includes an attachment mounting structure 104 including the attachment 106, an aperture 110 to allow placement of the attachment 106 on the surface of a tooth, and a number of supports 108. The structure illustrated in FIG. 1A, allows the treatment professional to place the apparatus 100 onto the teeth of a patient to provide a more accurate position and orientation for the attachment 106, with respect to the tooth surface, during the securing of the attachment 106 to the surface of the tooth than previous techniques.

The securing of the attachment can be accomplished in any suitable manner. For example, the attachment can be cured to the tooth surface, for instance, by use of a light source, such as ultra-violet (UV) light source, which will bond the attachment material directly to the surface of the tooth. In some embodiments, an adhesive material can be applied to the back side of the attachment and the adhesive can be used to secure the attachment to the tooth surface.

In various embodiments, the apparatus can be designed to have one surface shaped to conform to one or more contours of an exterior surface of a tooth (e.g., a surface that conforms to a portion of the front surface of a tooth), such that when the two surfaces are aligned, their contours match, thereby indicating to the treatment professional that the apparatus has been placed correctly.

This correct placement can be with respect to the placement of the apparatus with respect to the tooth in one or more dimensions (e.g., up, down, right, left, rotationally, etc. with respect to the tooth surface upon which the attachment will be applied). If the apparatus is correctly placed, then the attachment will also be correctly placed with respect to the tooth surface.

As used herein, "positioning" is the locating of the attachment at a particular point on the surface of a tooth and "orienting" is the movement of the attachment in a manner that does not change its position on the surface of the tooth (e.g., a rotation of the attachment about an axis or movement of the attachment in one or more directions that does not change its position on the surface of the tooth). For example, an attachment can be positioned at a particular point on the surface of a tooth and then can be oriented by rotating it, for example, parallel to the tooth surface, or along an axis perpendicular to the surface of the tooth. Other angles of rotation can also be used to orient the attachment without changing the attachment's position.

Figure 1B:
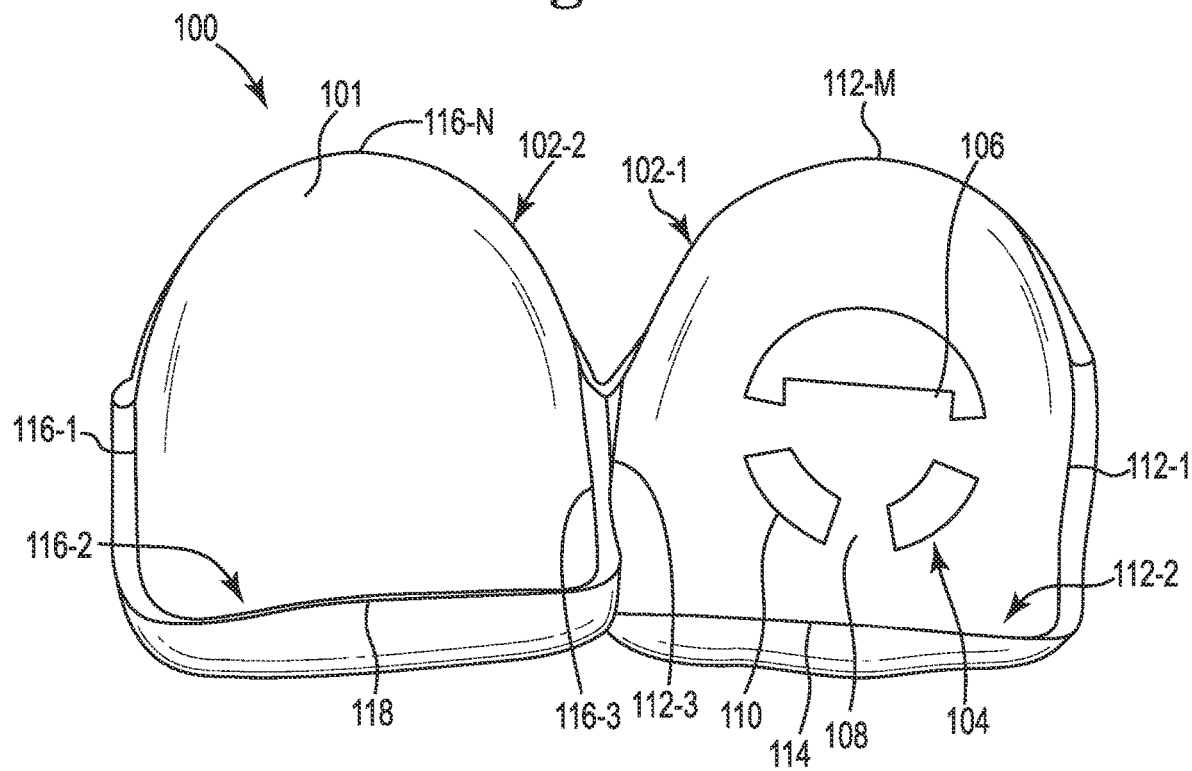
FIG. 1B illustrates a back view of the dental attachment placement structure of FIG. 1A.

In the embodiment of FIGS. 1A and 1B, the apparatus includes many surfaces that are shaped to conform to many contours of many exterior surfaces of multiple teeth (e.g., one or more contours of the front surface, side surfaces, edge surfaces, back surface, etc.).

Generally, the more surfaces used, the more accurate the positioning and/or orientation of the attachment, in relation to the tooth, can be to the desired correct placement. Also, when attaching multiple attachments, these surfaces can be used to accurately position and orient the attachments in relation to each other.

Once an attachment is placed on the tooth, it has to be secured to the tooth and the apparatus has to be removed. In some embodiments, such as that shown in FIGS. 1A and 1B, the apparatus can include one or more supports connecting the attachment to the body.

In such embodiments, the one or more supports can be made from a material that allows the support material 108 to be separated from the material of the attachment 106. For example, the support can be made from a material that can be broken at or near the location where the support and attachment are connected.

In some embodiments, the attachment between the support and the attachment can be released by a release agent, such as a chemical, heat, moisture, or other type of release agent. The release agent may, for example, dissolve a portion of the support and/or attachment in order to release the support and/or attachment from each other.

In various embodiments, the support and attachment can be fabricated from the same material, but the structure of the support can be such that it can be broken at a point to disconnect it from the attachment. Any suitable technique can be used to achieve the breaking or release of the support and/or attachment material in order to release the support from the attachment.

For example, the support structure may include a narrow section that is conducive to breaking at that location. In another embodiment, the support structure may include a scored section that is conducive to breaking at that location.

In various embodiments, the attachment can be mechanically mounted to the supports such that the attachment can be released from the supports once the attachment is secured to the surface of the tooth. This can be accomplished by any suitable releasable attachment structure. For example, one suitable structure is a groove located on each support and corresponding mating flanges on the attachment surface that can be slid out of the grooves to release the attachment from the supports.

FIG. 1B illustrates a back view of the dental attachment placement structure of FIG. 1A. In this view, the back side of the body 101 is shown including the back side of the attachment mounting structure 104 including the attachment 106 and supports 108, and the two inner surfaces of portions 102-1 and 102-2 of the body 101, each shaped to conform to the multiple contours of an exterior surface of a tooth are shown.

As used herein, a surface that is shaped to conform to a contour of an exterior surface of a tooth (i.e., an alignment surface) can be used to accurately position and/or orient the attachment on the tooth. For example, if surface of the apparatus is shaped to conform to a contour of the front surface of the tooth (e.g., surface 102-1 shown in FIG. 1A), then when the apparatus is pressed against the front surface of the tooth such that the contours of the tooth and the apparatus correspond to each other, the attachment will be correctly oriented with respect to the angle of the back side of the attachment to the surface of the tooth.

In the view shown in FIG. 1B, more surfaces shaped to conform to the multiple contours of an exterior surface of a tooth are shown than were visible in the view of FIG. 1A. As discussed above, if another surface is used, for example, a side surface 112-1, then the placement of the attachment can be more accurately accomplished with respect to its position and orientation.

For instance, when the side 112-1 is positioned along the corresponding side of the tooth such that their contours align, then the attachment should be the correct distance from the side of the tooth and will be correctly oriented with respect to the angle of the back side of the attachment to the surface of the tooth.

When more surfaces are utilized, the position and/or orientation of the attachment can be further precisioned. For example, the body 101 includes side surfaces 112-1, 112-3 of a first tooth, and side surfaces 116-1 and 116-3 of a second tooth. The body 101 also includes surfaces that are shaped to conform to the gingival line on a tooth 112-M and 116-N, and surfaces 112-2 and 116-2 that conform to the bottom edge of a tooth (and/or the bottom of the front and/or back side of the tooth).

Additionally, the embodiment of FIG. 1B includes a portion that conforms to the back side of the first tooth 114 and another portion that conforms to the back side of the second tooth 118. The use of such surfaces in conjunction with other surfaces can also allow for use of the corners of the teeth to be used to aid in positioning and/or orientation of an attachment. For example, the apparatus can be slid onto the tooth until the bottom edge of the tooth contacts the bottom edge 112-2 of the apparatus. When the front surface, the sides, corners, and bottom of the apparatus are aligned with their corresponding tooth surfaces, the attachment can be very precisely placed on its intended tooth surface.

Figure 1C:
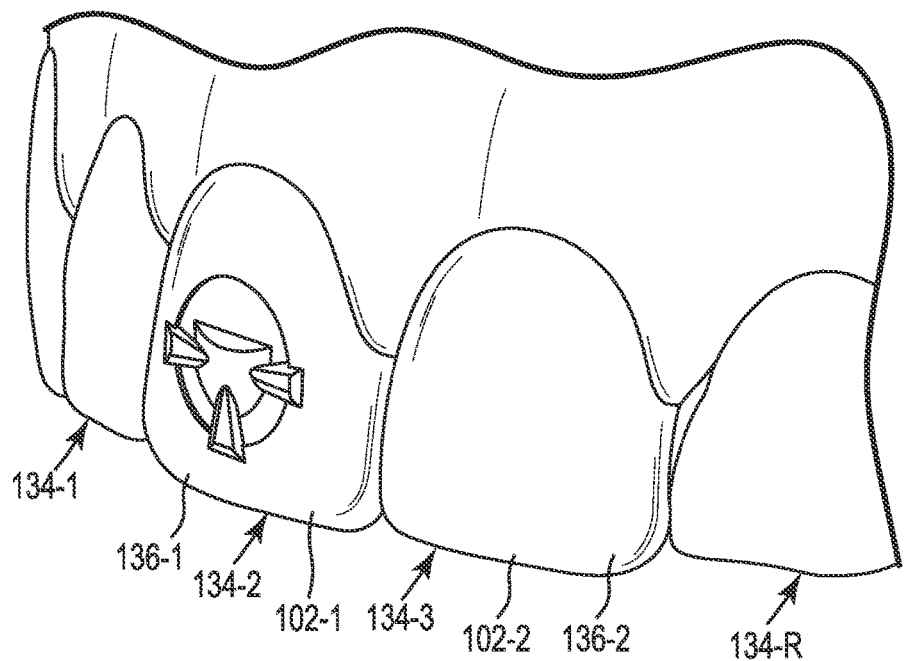
FIG. 1C illustrates a front view of the dental attachment placement structure of FIGS. 1A and 1B positioned on a tooth of a patient.

FIG. 1C illustrates a front view of the dental attachment placement structure of FIGS. 1A and 1B positioned on a tooth of a patient. In the view of FIG. 1C, several teeth and the gingiva of a patient are illustrated, including teeth 134-1, 134-2, 134-3, and 134-R. The apparatus 100 has been placed on the two of the teeth (134-2 and 134-3) such that the inner surfaces of portions 102-1 and 102-2 are placed in contact with tooth surfaces 136-1 and 136-2, respectively.

Figure 1D:
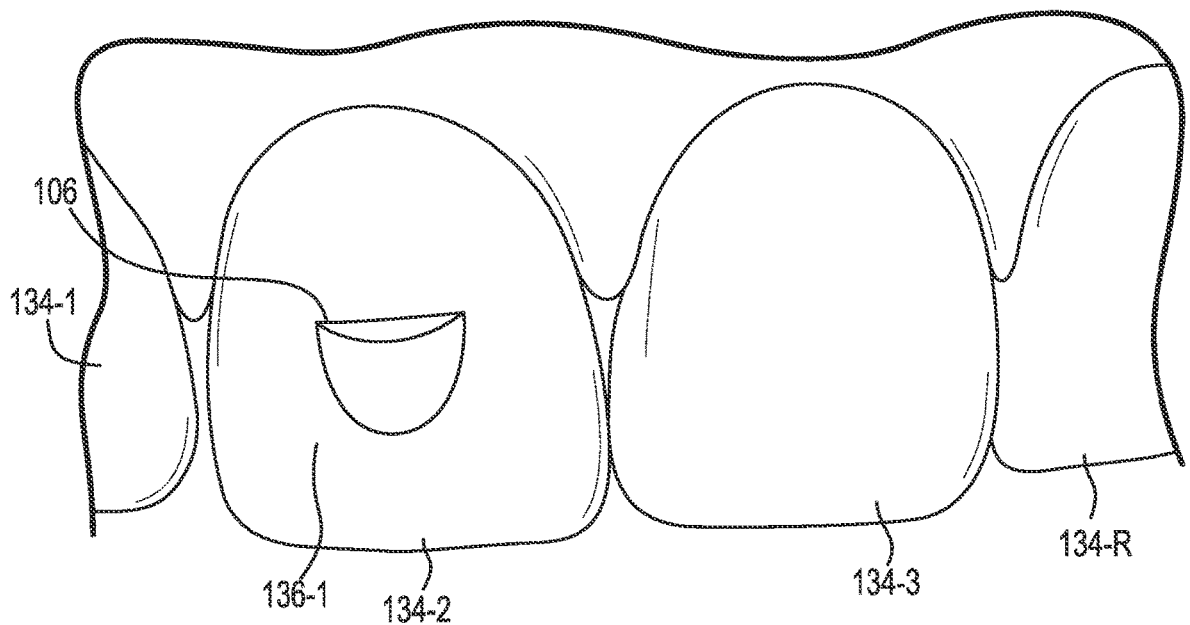
FIG. 1D illustrates a front view of a dental attachment attached to a tooth of a patient utilizing the dental attachment placement structure of FIGS. 1A and 1B.

FIG. 1D illustrates a front view of a dental attachment attached to a tooth of a patient utilizing the dental attachment placement structure of FIGS. 1A and 1B. The resultant placement has been accomplished via the attachment mounting structure illustrated in FIGS. 1A and 1B.

In this manner, the attachment 106 has been correctly positioned on the surface 136-1 of tooth 134-2 and oriented such that it can provide the desired force to the teeth of the patient (e.g., 134-1, 134-2, 134-3, 134-R, and/or other teeth of the patient) when combined with the dental appliance that will attach to the attachment.

In some embodiments, such as that shown in FIGS. 1A-1C, the attachment and/or the dental attachment placement structure, can be fabricated through direct fabrication, such as via a three-dimensional (3D) printer). This can be beneficial as the treatment profession can print these components at their location rather than at a manufacturing facility. Further, these components do not need to be formed around a mold of teeth when direct printed, this can save in manufacturing costs due to less time, materials, and employee time in creating such models and removing the components from the models.

Direct fabrication also allows for the design to be more easily and readily changed because the design can be altered via a computing device and direct printed from the modified design stored in memory on the computing device or a connected network or memory. Further, direct fabrication allows for creation of components of different material without substantial changes to equipment that may be used at a manufacturing facility, among other benefits.

For example, a dental attachment placement apparatus can be formed by printing, using a three-dimensional printing apparatus, an attachment, out of an attachment material and printing, using a three-dimensional printing apparatus, a dental attachment placement structure, connected to the attachment to hold the attachment in a particular position. In some embodiments, the dental attachment placement structure and the attachment can be fabricated from the same material. Material, examples include: polymers such as, polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, or a combination thereof, which can be used to make dental appliances, such as aligners, or curable composite (e.g., a resin material) that can be used to attach orthodontic appliances to teeth or create orthodontic structures.

In some embodiments, the dental attachment placement structure can be fabricated out of a second material that is different than the attachment material. For example, the attachment can be fabricated from a composite material and the dental attachment placement structure can be fabricated from a polymer, such as those discussed above. In some embodiments, the attachment and dental attachment placement structure can be constructed such that they are connected to each other. As discussed herein, this connection can be designed to be cut, broken, or otherwise released to allow the dental attachment placement structure to be removed while the attachment is positioned on the tooth.

As discussed herein, one other benefit to direct fabrication is that one or more surfaces that will be used to attach the attachment to a tooth and/or to position an attachment with respect to one or more teeth can be fabricated with surfaces that will mate with the corresponding surface of the one or more teeth to accomplish these functionalities (attachment and/or positioning of the attachment). This can be accomplished by virtual design of these surfaces and then using these virtual designs to fabricate the attachment and/or the dental attachment placement structure directly.

Figure 2:
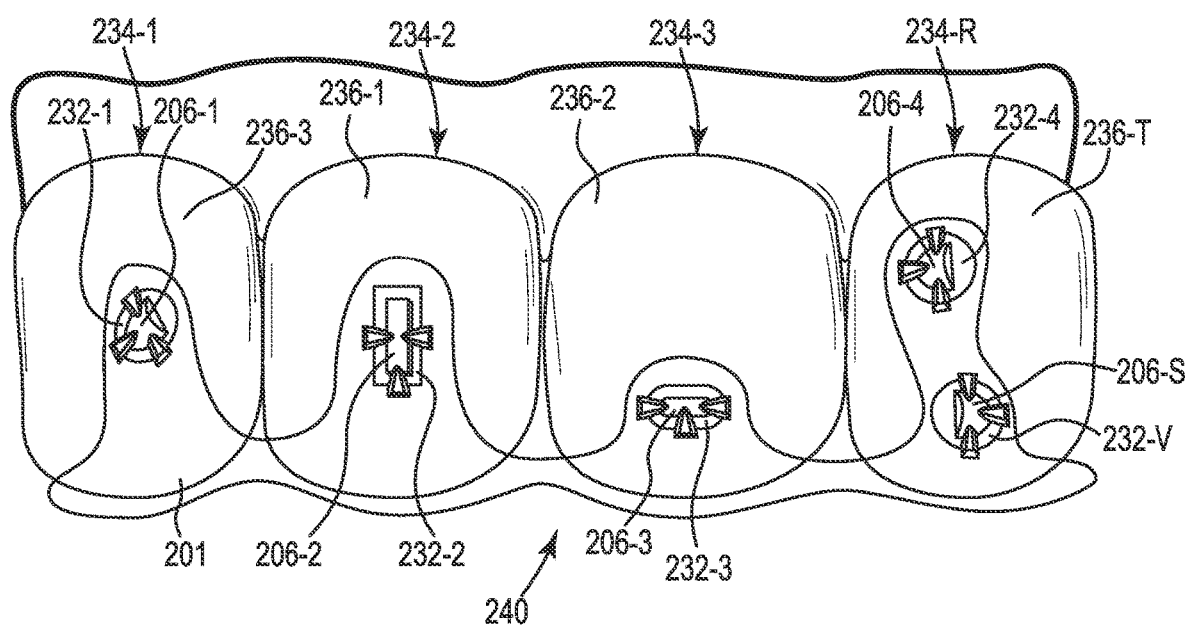
FIG. 2 illustrates a front view of a dental attachment placement structure having multiple attachment placement components provided on the structure according to a number of embodiments of the present disclosure.

FIG. 2 illustrates a front view of a dental attachment placement structure having multiple attachment placement components provided on the structure according to a number of embodiments of the present disclosure. In the embodiment of FIG. 2, the body 201 of apparatus 240 has an attachment mounting structure has an aperture 232-1 with an attachment 206-1 placed in the aperture. Through use of the apparatus 240, the attachment is in the desired position and orientation for securing to the surface 236-3 of tooth 234-1.

Attachments 206-2, 206-3, 206-4, and 206-S are also positioned in apertures 232-2, 232-3, 232-4, and 232-V on surface 236-1 of tooth 234-2, 236-2 of tooth 234-3, and 236-T of tooth 234-R. In such an embodiment, one or more of the teeth can have multiple attachments affixed thereon.

In order to save fabrication time and materials cost, the apparatus may include multiple attachment locations and only some may be used at any given time. In such applications, the apparatus 240 can, for example, be used to affix attachment 206-2 at one point in time and can be reused to attach 206-S at aperture 232-V or an attachment at one or more of the other locations on the apparatus (e.g., apertures 232-1, 232-2, and/or 232-3) at a different time.

Another feature of the embodiment of FIG. 2, is that in order to save fabrication time and materials cost, an apparatus with less material can be used. In such embodiments, the apparatus can be designed such that a reduced amount or minimized amount of material is used in order to properly position the attachment at a desired location.

Further, in prior concepts, treatment professionals may only have had access to a few, standardized attachment shapes. In this manner, the options for treatment may have been restricted based on the limited forces that could be provided by the standardized attachments. If any other attachment shape was desired, the treatment professional could file or grind the attachment surfaces to change its shape, but a treatment plan would not take these modifications into account and therefore the actual result would be different than the treatment plan result. This resulted in additional time spent in getting the proper shape, misshapen attachments that did not fit or function correctly, and other issues.

Although embodiments of the present disclosure can be used to form such standardized attachments, since the apparatus can be fabricated to be used with a specific patient's teeth positioning, specialized attachments can also be designed and can be made available to a treatment professional.

Such specialization can also, for example, include the size of the attachment, shape of the attachment, and other suitable specialized characteristics. Accordingly, the patient will be able to get a more customized treatment based on use of such embodiments. This can allow the apparatus to be specialized to the patient, but not be onerous on the treatment professional who, for example, may not have attachment design skills or capabilities.

In some embodiments, the treatment professional may also select one or more attachment materials or attachment types and/or select the location upon which they should be applied. Such embodiments can allow further customization of the apparatus and can be taken into account when the manufacture of the attachment templates are created. Further, in various embodiments, this customization can be made for each appliance (or for multiple appliances) in a set of appliances of a treatment plan.

In some embodiments, a computing device (such as that described in relation to FIG. 8 below) can be used to create a treatment plan to move the teeth of a patient in an incremental manner to improve their position within the patient's mouth. Other dental appliances can be created to aid patients with sleep apnea or medication delivery, among other types of appliances.

A computing device can be used to create such devices or molds to fabricate such dental appliances, attachments, and/or attachment placement structures. In some embodiments, a computing device can be used to virtually model such dental appliances, attachments, and/or attachment placement structures.

For example, through use of a treatment plan and/or virtual modeling, a dental appliance (e.g., an aligner for aligning teeth or jaws of a patient) or attachment placement structure can be made, for example, by thermal-forming a sheet of plastic over a physical dental mold. The physical dental mold, for instance, can represent an incremental position to which a patient's teeth are to be moved and can include attachment shapes formed in the mold.

In this manner, one or more surfaces of the dental appliance can engage with one or more surfaces of the one or more attachments (when the finished dental appliance is placed in the patient's mouth with the actual attachments). By having the attachments on the mold, the dental appliance is formed with the surfaces that will interact with the attachments.

The physical dental mold can be manufactured, for example, by downloading a computer-aided design (CAD) virtual dental model to a rapid prototyping process, such as, for example, a computer-aided manufacturing (CAM) milling, stereolithography, and/or photolithography process.

The dental mold (e.g., set of molded teeth and/or jaw) can be created from a virtual model of a number of teeth and/or jaw of a patient. A virtual model, for example, can include an initial virtual dental model and/or intermediate virtual dental model (wherein the teeth of the patient have been moved with respect to their actual physical position). A dental mold can be formed in accordance with a unique treatment file that, for example, identifies a patient, a stage of a treatment plan, the virtual model of the number of teeth and/or jaw, and/or whether the dental mold is of the upper and/or lower dental arch.

In some computing device system processes, a treatment file can be accessed by a rapid prototyping apparatus machine or direct fabrication device, such as a SLA or 3D printing machine, to form and/or create the dental mold. As discussed above, the result of the dental mold can include a set of molded teeth.

The set of molded teeth can include at least a replica of a number of teeth of the patient, but can also include other features such as gingival and jaw structures, among others. The dental mold can be used to make a dental appliance, for example, by creating a negative impression of the dental mold using polymeric sheets of material and vacuum forming the sheets over the dental mold, as discussed above.

For instance, a dental appliance or attachment placement structure can be formed by layering a thermoformable sheet of material and/or multiple sheets of one or more materials over the dental mold. The materials can include a polymeric material, for instance.

Generally, the dental appliance or attachment placement structure is produced and/or formed by heating the polymeric thermoformable sheet and vacuum or pressure forming the sheet over the dental mold (e.g., a number of molded teeth). A dental appliance or attachment placement structure can, for example, include a negative impression of the dental mold. Such molding techniques can be used to create the dental appliances and attachment placement structures.

Figure 3A:
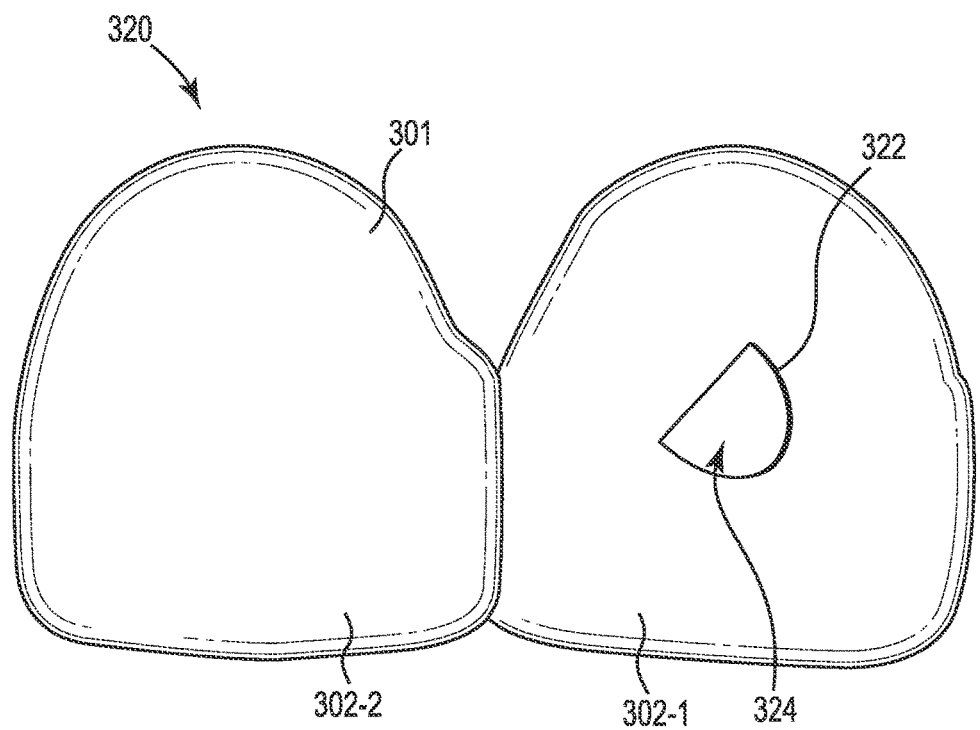
FIG. 3A illustrates a front view of a dental attachment placement structure for etching a tooth according to a number of embodiments of the present disclosure.
Figure 3B:
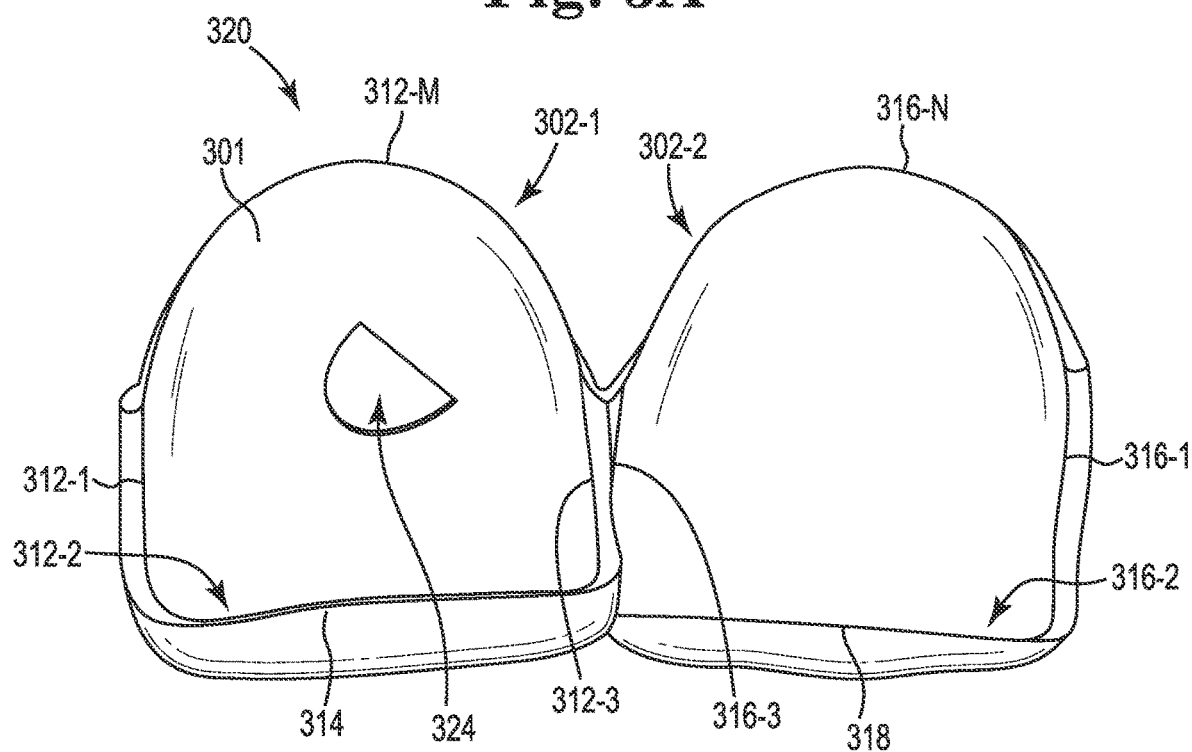
FIG. 3B illustrates a back view of the dental attachment placement structure of FIG. 3A.

FIGS. 3A and 3B illustrate another apparatus embodiment that can be used in the placement of an attachment on the surface of a tooth. FIG. 3A illustrates a front view of a dental attachment placement structure for etching a tooth according to a number of embodiments of the present disclosure. FIG. 3B illustrates a back view of the dental attachment placement structure of FIG. 3A.

In some instances, it may be beneficial to prepare the surface of the tooth for adhering of a dental attachment thereto. It is ideal if the preparation of the surface of the tooth takes place only at the area in which the attachment is to be attached.

Such preparation can include etching of the surface of the tooth which improves the adhesion between the tooth surface and the attachment or adhesive material used to adhere the attachment to the tooth. In embodiments such as that illustrated in FIGS. 3A, 3B, and 4, the dental attachment placement structure can be utilized as an etch mask that allows the etching to occur in the area to which the attachment is to be placed without etching other surfaces not at the attachment area.

Similar to the apparatus of FIG. 1A, in the embodiment of FIG. 3A, the apparatus 320 includes a body 301 having at least one surface shaped to conform to one or more of the contours of an exterior surface of a tooth. The body has multiple surfaces, 302-1 and 302-2, each shaped to conform to the multiple contours of an exterior surface of a tooth, and other surfaces will be discussed in more detail in FIG. 3B.

In the embodiment of FIG. 3A, the body 301 includes an aperture 324 formed in portion 302-1. The aperture 324 has a specific shape 322 that, when the apparatus 320 is placed correctly on the tooth, will allow the attachment area (i.e., the area at which the attachment will be attached) to be etched without etching other areas of the tooth. The structure illustrated in FIG. 3A, allows the treatment professional to place the apparatus 320 onto the teeth of a patient to provide a mask for purposes of etching in a more accurate position and orientation for placement of an attachment (e.g., the shape of aperture 324 would be appropriate for an attachment such as that illustrated in FIG. 1C (106)), with respect to the tooth surface, than previous techniques.

Similar to FIG. 1B, the embodiment illustrated in FIG. 3B includes multiple surfaces that can be used to assist in the alignment of the etch mask with respect to the intended surface of the tooth to which the attachment is to be secured. For example, one or more of surfaces: 312-1, 312-2, 312-3, 312-M, 314, 316-1, 316-2, 316-3, 316-N, 318, and/or inner surfaces of portions 302-1 and/or 302-2 can be utilized in various embodiments of the present disclosure.

In such an embodiment, the surface of the tooth can be etched with an etching material that can, for example be brushed onto the surface of the tooth by the treatment professional through the aperture 324. In the embodiment of FIGS. 3A and 3B, the shape 322 of the aperture 324 is sized and shaped to be as large or slightly larger or smaller than the attachment that is to be placed on the tooth. However, in some embodiments, the size and/or shape of the aperture may be different than the surface of the attachment that is to be placed in the tooth.

When shaped like the surface of the attachment that is to be placed in the tooth the treatment professional can align the shape of the attachment with the shape of the etched area such that the attachment is at the correct location and in the correct orientation with respect to the surface of the tooth. Although a particular attachment shape and aperture shape are illustrated, any suitable attachment shape and corresponding aperture shape can be utilized in the embodiments of the present disclosure.

The present example also includes a portion of the body (e.g., surfaces 212-1, 212-2, 212-3, 212-M, and/or the inner surface of 202-1) having a contour that is shaped to correspond with a contour of an alignment surface of a tooth (e.g., front surface, back surface, side surface, edge surface, etc.) and when the contour of the body and the corresponding contour is aligned, the etching area is located at the particular position.

In another example embodiment, a dental attachment placement apparatus includes a body that has an attachment mounting structure. The body also includes a surface (e.g., surfaces 212-1, 212-2, 212-3, 212-M, and/or the inner surface of 202-1) having a contour that is shaped to correspond with a contour of an alignment surface (e.g., front surface, back surface, side surface, edge surface, etc.) of a tooth and when the contour of the body and the corresponding contour of the tooth are aligned, a dental attachment, when placed in the attachment mounting structure, is located at the particular position with respect to an exterior surface of the tooth.

In some embodiments, the body includes at least a second surface (e.g., inner surface of 102-2) shaped to correspond with a contour of an alignment surface of a second tooth. Further, the body can include a second attachment mounting structure (e.g., as shown in FIGS. 3, 332-1 and 332-P) for attaching a second dental attachment to an exterior surface of the second tooth (e.g., 434-3).

Another example embodiment provides a dental attachment placement apparatus having a body that includes an attachment mounting structure having an aperture that allows an attachment to be placed through the body and onto an exterior surface of the tooth. The body also includes a surface having a contour that is shaped to correspond with a contour of an alignment surface of a tooth and when the contour of the body and the corresponding contour of the tooth are aligned, a dental attachment, when placed in the aperture, is located at the particular position with respect to an exterior surface of the tooth.

As illustrated in FIGS. 1B and 2B, in some embodiments, the body includes multiple surfaces having contours that are shaped to correspond with contours of multiple alignment surfaces of a tooth. In some such embodiments, when the contours of the body and the corresponding contours of the tooth are aligned, they frictionally hold the apparatus in place against the tooth during securement of the attachment. For example, the inner surface of 102-1 and inner surface 114 can engage the corresponding surfaces of the tooth to hold the apparatus in place while the attachment is being placed and/or secured. This can be beneficial as it, for example, can allow the treatment professional to use both hands to address other tasks while the attachment is in position to be secured or is being secured.

Figure 3C:
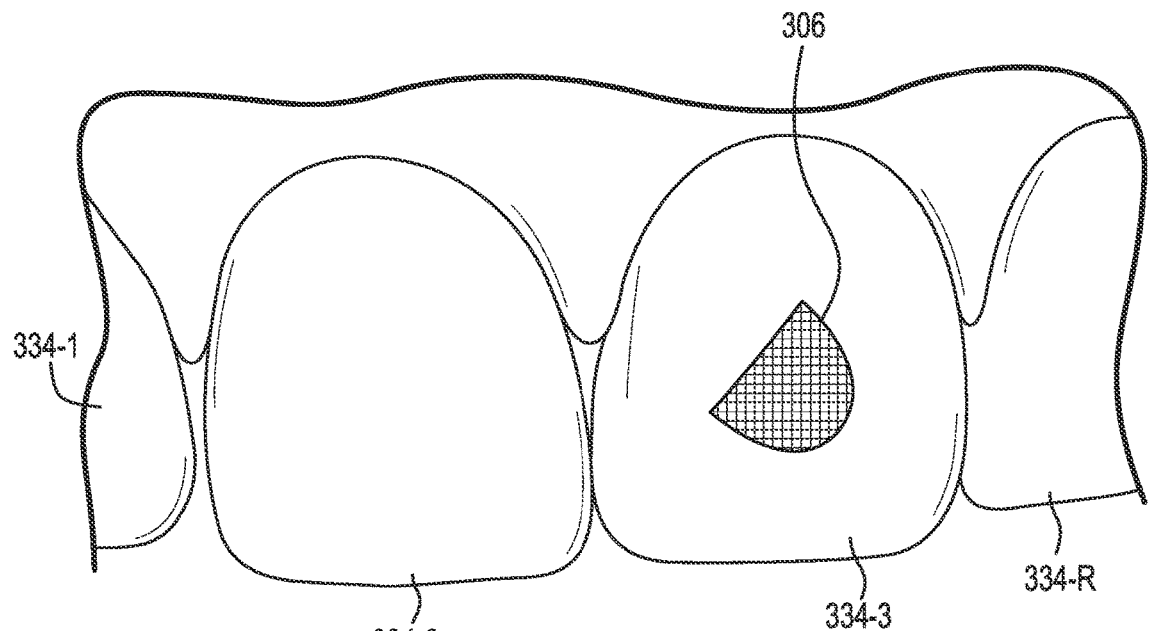
FIG. 3C illustrates a front view of an etched area of a tooth of a patient that has been etched utilizing the dental attachment placement structure of FIGS. 3A and 3B.

In some embodiments, the body can include multiple attachment mounting structures each having an aperture that allows an attachment to be placed through the body and onto an exterior surface of the tooth. For example, in the embodiment shown in FIG. 4, the apparatus 401 includes multiple attachment mounting structures each having apertures (e.g., 432-4 and 432-V) that allows an attachment to be placed through the body and onto the exterior surface 436-T of tooth 434-R. FIG. 3C illustrates a front view of an etched area of a tooth of a patient that has been etched utilizing the dental attachment placement structure of FIGS. 3A and 3B. The resultant etched area 306 has been accomplished via the attachment mounting structure illustrated in FIGS. 3A and 3B.

In this manner, the surface of the tooth can be etched at an area that is large enough to secure an attachment, but not un-necessarily large. Also, in this manner, an attachment can be correctly positioned on the surface of tooth 334-3 and oriented such that it can provide the desired force to the teeth of the patient (e.g., 334-1, 334-2, 334-3, 334-R, and/or other teeth of the patient) when combined with the dental appliance that will attach to the attachment.

Figure 4:
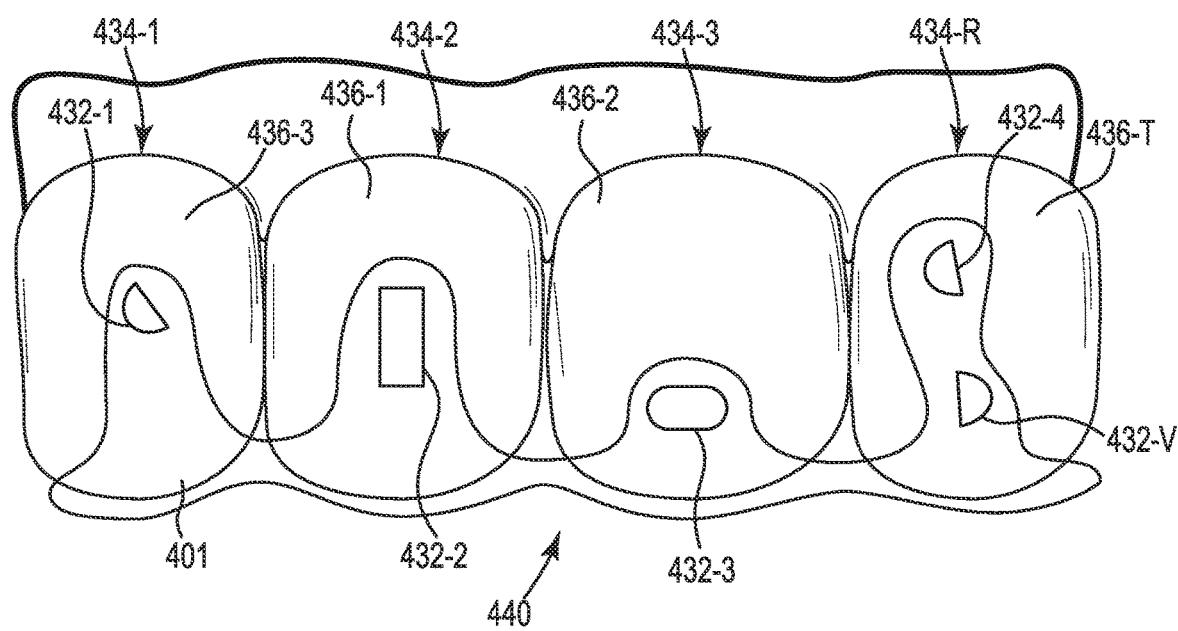
FIG. 4 illustrates a front view of a dental attachment placement structure having multiple attachment placement components provided on the structure according to a number of embodiments of the present disclosure.

FIG. 4 illustrates a front view of a dental attachment placement structure having multiple attachment placement components provided on the structure according to a number of embodiments of the present disclosure. In the embodiment of FIG. 4, the body 401 of apparatus 440 has an attachment mounting structure that includes multiple apertures 432-1, 432-2, 432-3, 432-4, and 432-V that can be used to etch portions of teeth 434-1, 434-2, 434-3, 434-R on surfaces 436-1, 436-2, 436-3, and 436-T.

In order to save fabrication time and materials cost, the apparatus may include multiple etch locations and only some may be used at any given time. In such applications, the apparatus 440 can, for example, be used to etch a location on a tooth at one point in time and can be reused to etch another location on a tooth at another point in time.

Similar to the embodiment of FIG. 2, another feature of the embodiment of FIG. 4, is that in order to save fabrication time and materials cost, an apparatus with less material can be used. In such embodiments, the apparatus can be designed such that a reduced amount or minimized amount of material is used in order to properly etch a surface of a tooth at a desired location.

Figure 5A:
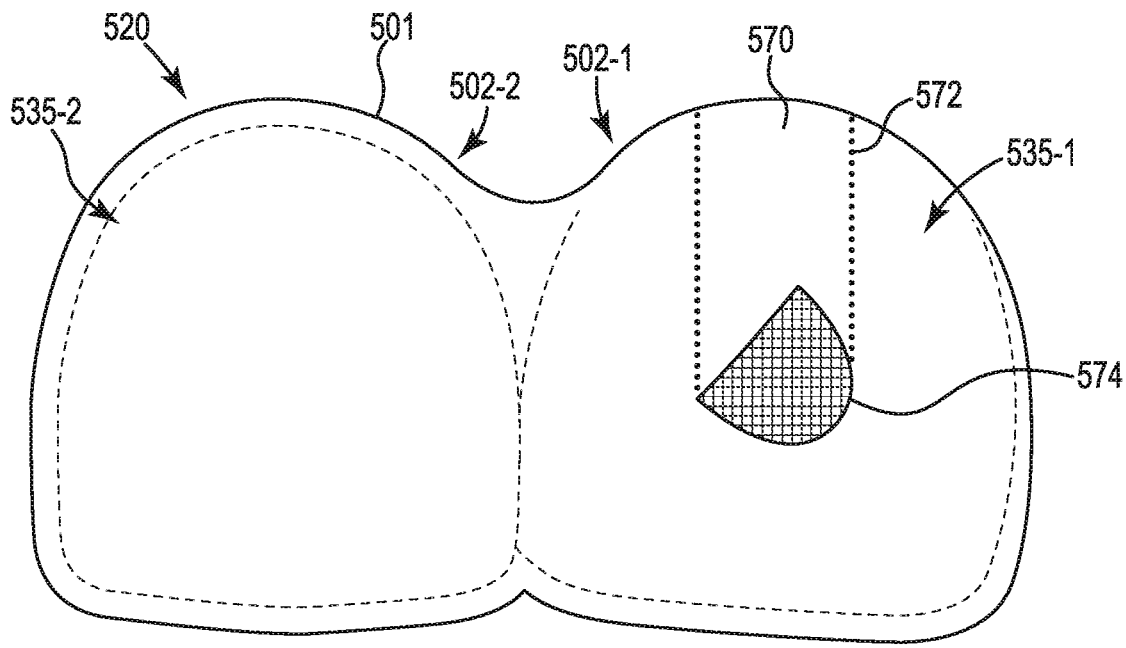
FIG. 5A illustrates a front view of another dental attachment placement structure for etching a tooth according to a number of embodiments of the present disclosure.

FIG. 5A illustrates a front view of another dental attachment placement structure for etching a tooth according to a number of embodiments of the present disclosure. The embodiment of FIG. 5A is similar to that of FIG. 3A.

In the embodiment of FIG. 5A, the apparatus 520 includes a body 501 having at least one surface shaped to conform to one or more of the contours of an exterior surface of a tooth. The body has multiple surfaces, 502-1 and 502-2, each shaped to conform to the multiple contours of an exterior surface of a tooth. Some embodiments may have one or more other surfaces similar to those shown in FIG. 3B to aid in the alignment of the dental attachment placement structure with the tooth. In the example of FIG. 5A, the surface 502-1 is positioned on tooth surface 535-1 and surface 502-2 is positioned on tooth surface 535-2.

In the embodiment illustrated in FIG. 5A, the dental attachment placement structure allows for the surface of the tooth to be etched through the aperture. The etched area is illustrated at 574. Adjacent to the aperture is a releasable portion 570.

The releasable portion can be released by any suitable release mechanism. For example, a series of perforations 572 can be cut into the body 501 to allow the portion 570 to be torn away from the rest of the body 501. This can allow the dental attachment placement structure to also be used as a guide for the placement of an attachment to be placed in the correct position.

For example, once the area is etched as shown in FIG. 5A, an attachment can be secured to the etched area. If an attachment has a surface that is shaped to correspond to the shape of the aperture, then the edges of the aperture can be used as a guide to the correct positioning of the attachment. Once secured, the releasable portion 570 can be removed and the rest of the body 501 can be removed from the teeth while the attachment remains attached to the tooth surface 535-1.

Figure 5B:
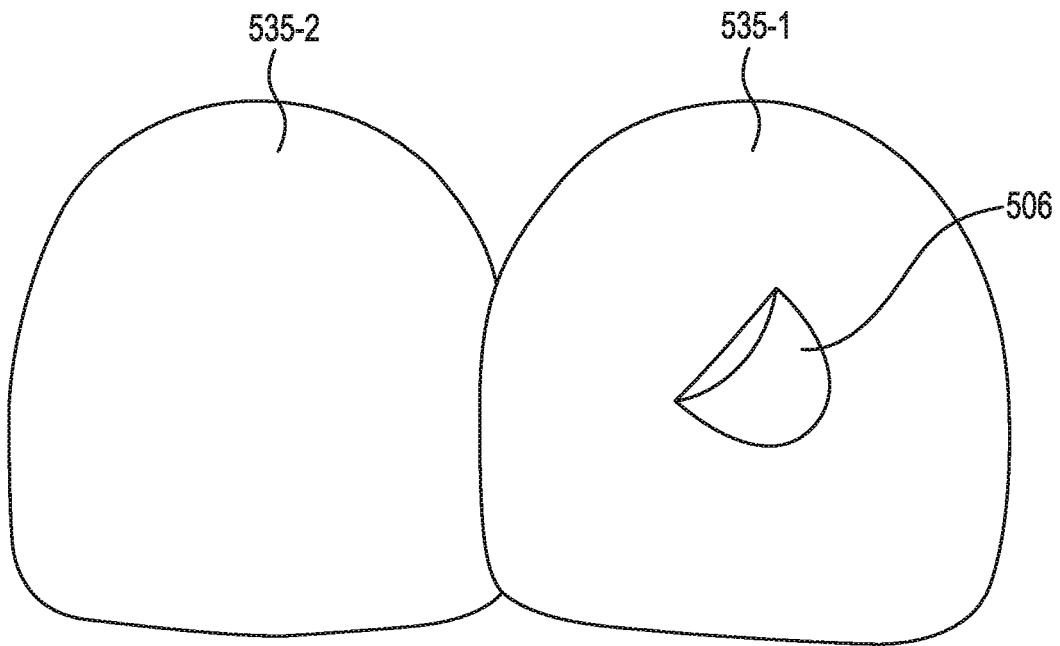
FIG. 5B illustrates front view of a dental attachment attached to a tooth of a patient utilizing the dental attachment placement structure of FIG. 5A.

FIG. 5B illustrates front view of a dental attachment attached to a tooth of a patient utilizing the dental attachment placement structure of FIG. 5A. This figure includes a tooth surface 535-1 of a first tooth and a tooth surface of a second tooth 535-2, and an attachment 506 mounted on the surface 535-1.

As can be seen from this figure, the attachment 506 is positioned and oriented on the surface of the tooth 535-1 in the same position and orientation as the etched area 574, thereby allowing better adhesion of the attachment 506 to the surface of the tooth 535-1. This is because the attachment was placed in the aperture of body 501 while it was positioned on tooth surfaces 535-1 and 535-2, then removed after the attachment 506 was adhered to etched area 574.

Figure 6A:
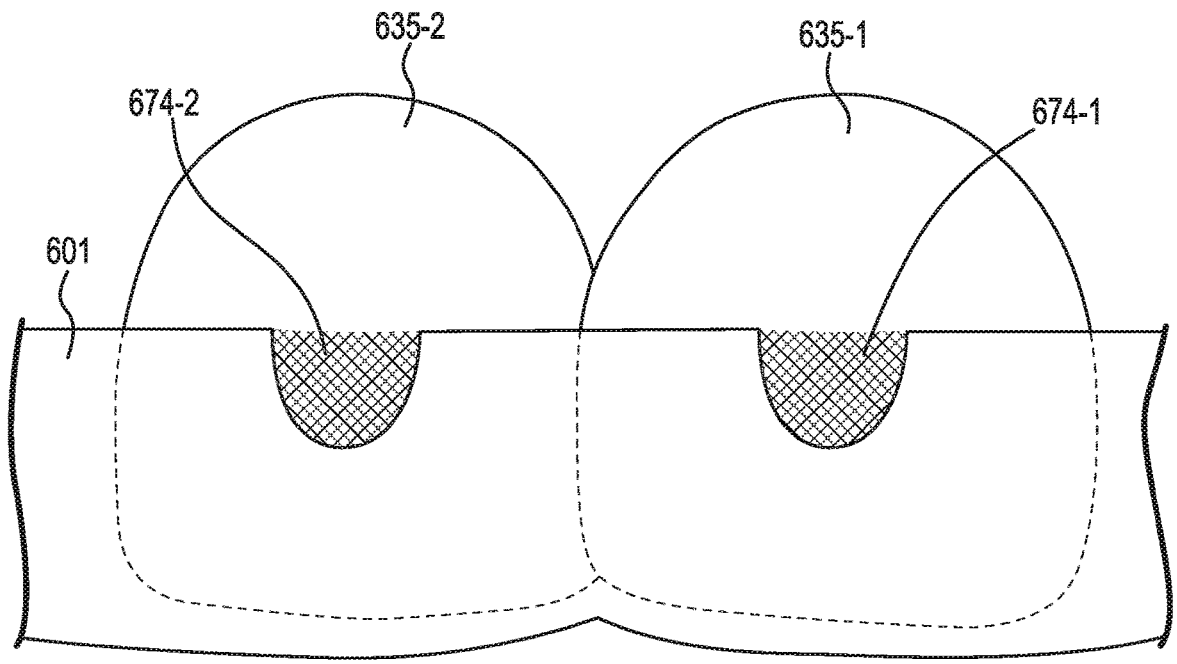
FIG. 6A illustrates a front view of another dental attachment placement structure for etching a tooth according to a number of embodiments of the present disclosure.

FIG. 6A illustrates a front view of another dental attachment placement structure for etching a tooth according to a number of embodiments of the present disclosure. FIG. 6A illustrates an embodiment wherein the body 601 of the dental attachment placement structure has apertures that do not fully surround the area to be etched. In such embodiments, the body can be used as a guide for what area is to be etched (e.g., areas 674-1 and 674-2), and as a guide to placement of one or more attachments (e.g., 606-1 and 606-2), but also allows for removal of the body 601, once the attachment has been secured to the surface of the tooth (e.g., 635-1 and/or 635-2).

Figure 6B:
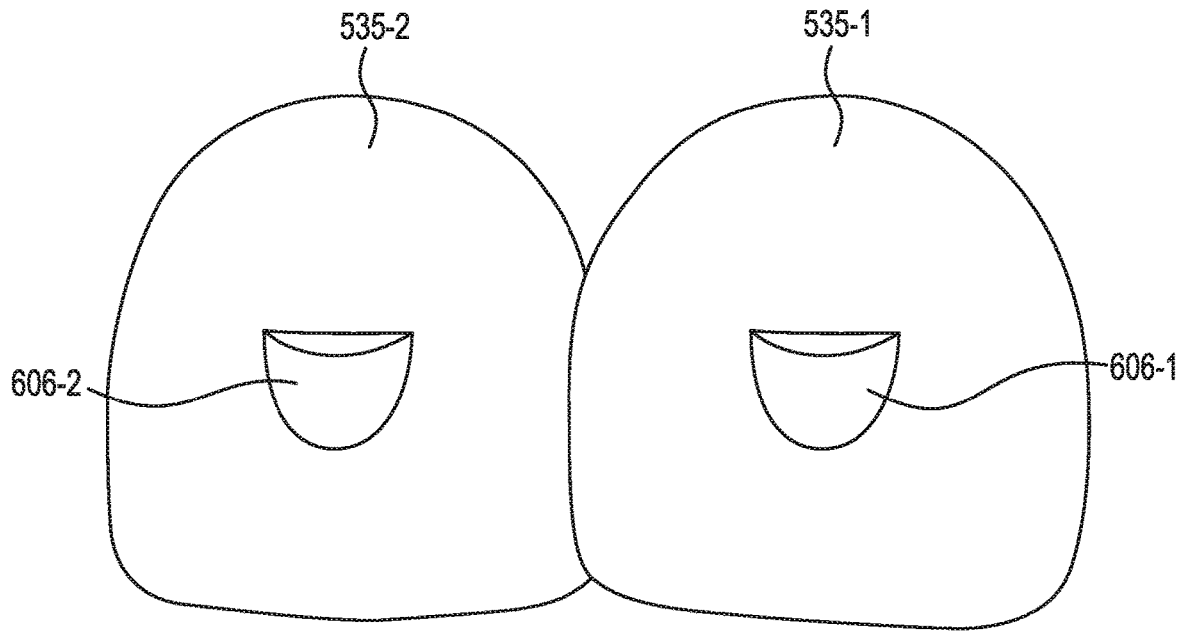
FIG. 6B illustrates front view of multiple dental attachments attached to multiple teeth of a patient utilizing the dental attachment placement structure of FIG. 6A.

For instance, FIG. 6B illustrates front view of multiple dental attachments attached to multiple teeth of a patient utilizing the dental attachment placement structure of FIG. 6A. This figure includes a tooth surface 635-1 of a first tooth and a tooth surface of a second tooth 635-2, and attachments 606-1 and 606-2 mounted on the surfaces 635-1 and 635-2, respectively.

As can be seen from FIG. 6B, the attachments 606-1 and 606-2 are positioned and oriented on the surface of the teeth 635-1 and 635-2 in the same position and orientation as the etched areas 674-1 and 674-2, thereby allowing better adhesion of the attachments 606-1 and 606-2 to the surface of the teeth 635-1 and 635-2. This is because the attachment was placed in the apertures of body 601 while it was positioned on tooth surfaces 635-1 and 635-2, then removed after the attachments 606-1 and 606-2 were adhered to etched areas 674-1 and 674-2.

Figure 7A:
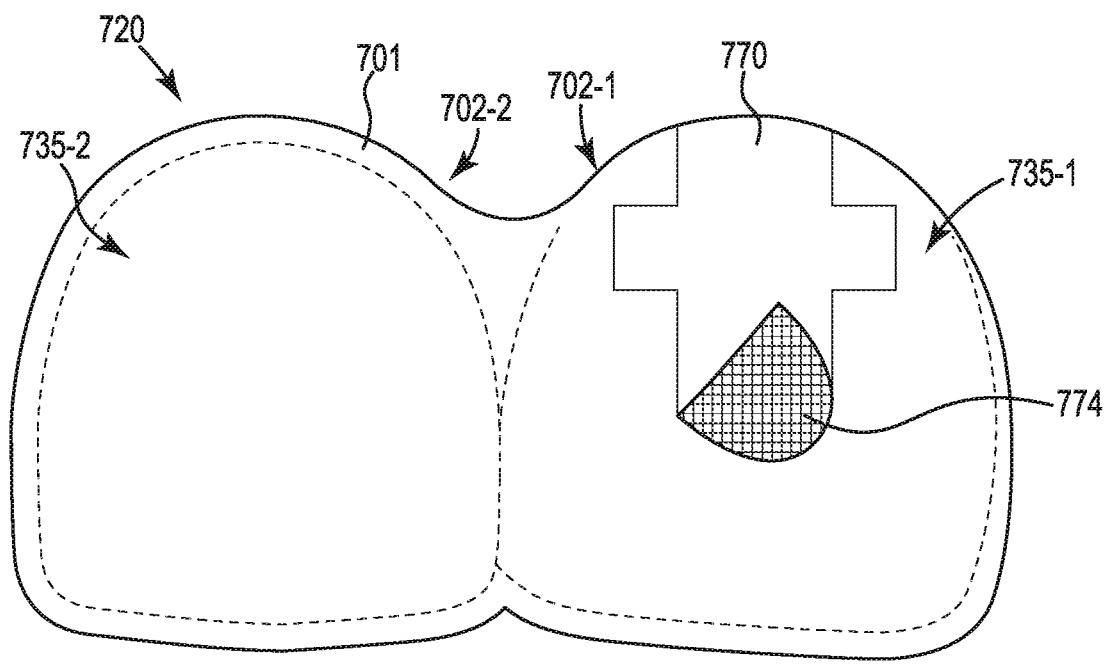
FIG. 7A illustrates a front view of another dental attachment placement structure for etching a tooth according to a number of embodiments of the present disclosure.

FIG. 7A illustrates a front view of another dental attachment placement structure for etching a tooth according to a number of embodiments of the present disclosure. The embodiment of FIG. 7A is similar to that of FIG. 5A.

In the embodiment of FIG. 7A, the apparatus 720 includes a body 701 having at least one surface shaped to conform to one or more of the contours of an exterior surface of a tooth. The body has multiple surfaces, 702-1 and 702-2, each shaped to conform to the multiple contours of an exterior surface of a tooth.

As with other embodiments discussed herein, some embodiments may have one or more other surfaces similar to those shown in FIG. 3B to aid in the alignment of the dental attachment placement structure with the tooth. In the example of FIG. 7A, the surface 702-1 is positioned on tooth surface 735-1 and surface 702-2 is positioned on tooth surface 735-2 to aid in positioning and/or orientation of the dental attachment placement structure with respect to the tooth to which an attachment is to be attached and thereby the positioning and/or orientation of the attachment to the tooth.

In the embodiment illustrated in FIG. 7A, the dental attachment placement structure allows for the surface of the tooth to be etched through the aperture. The etched area is illustrated at 774. Adjacent to the aperture is a removable portion 770.

The removable portion can be held in place by any suitable mechanism. For example, the removable portion can be shaped like a puzzle piece that mates with the rest of the body 701 in a particular orientation based on the removable portion 770 having an irregular shape. As used herein, an irregular shape is a shape that can only be positioned in one way with the rest of the body 501 such that the aperture has a desired shape for etching and/or positioning of an attachment therein. This can allow the dental attachment placement structure to be used for etching of the surface of a tooth and/or to be used as a guide for the placement of an attachment to be placed in the correct position.

For example, once the area is etched as shown in FIG. 7A, an attachment can be secured to the etched area. If an attachment has a surface that is shaped to correspond to the shape of the aperture, then the edges of the aperture can be used as a guide to the correct positioning of the attachment. Once secured, the removable portion 770 can be removed and the rest of the body 701 can be removed from the teeth while the attachment remains attached to the tooth surface 735-1.

In some embodiments, the edges of the removable portion and the edges on the body that correspond to the edges of the removable portion can be slanted such that when the removable portion is positioned into the rest of the body, it can be held in place. This can allow the treatment professional the ability to use their hands to do other things without having to hold the removable portion in place.

Also, in embodiments such as that shown in FIG. 7A, the apparatus can be positioned to accomplish etching (with the removable portion in place). The removable portion can be removed once the etch material and has been applied. Then, the removable portion can be repositioned with the rest of the body for securing of an attachment to the tooth. Once the attachment is secured to the tooth, the removable portion can be removed again to allow for removal of the apparatus for the patient's mouth without having to pull a portion of the apparatus over the attachment.

Figure 7B:
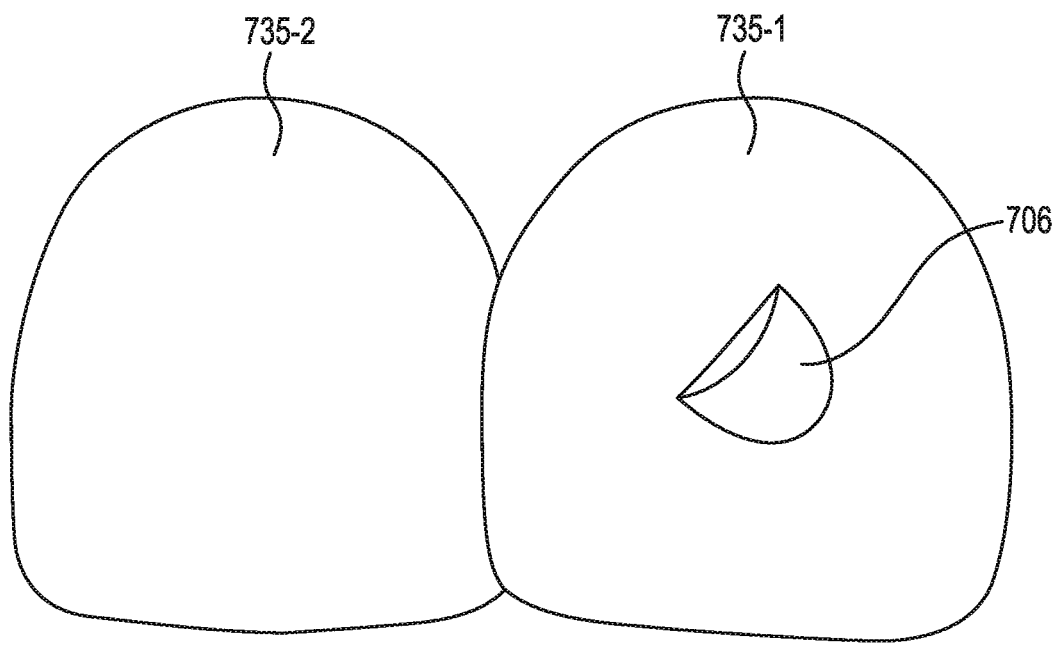
FIG. 7B illustrates front view of a dental attachment attached to a tooth of a patient utilizing the dental attachment placement structure of FIG. 7A.

FIG. 7B illustrates front view of a dental attachment attached to a tooth of a patient utilizing the dental attachment placement structure of FIG. 7A. This figure includes a tooth surface 735-1 of a first tooth and a tooth surface of a second tooth 735-2, and an attachment 706 mounted on the surface 735-1.

As illustrated in this figure, the attachment 706 is positioned and oriented on the surface of the tooth 735-1 in the same position and orientation as the etched area 774, thereby allowing better adhesion of the attachment 706 to the surface of the tooth 735-1. As with the embodiment of FIGS. 5A and 5B, this is because the attachment was placed in the aperture of body 701 while it was positioned on tooth surfaces 735-1 and 775-2, then removed after the attachment 706 was adhered to etched area 774.

As can be appreciated by the discussion of these different embodiments, in can be noted that each of these types of attachment mounting structures can provide an accurate mechanism for positioning and orienting the attachment with respect to the surface of the tooth to which the attachment is to be secured, but one type may have benefits over another in some applications based on one or more characteristics (e.g., whether etching is desired, space available for placement of the attachment, number of attachments to be placed on a single tooth, type of securement that will be used, etc.).

Figure 8:
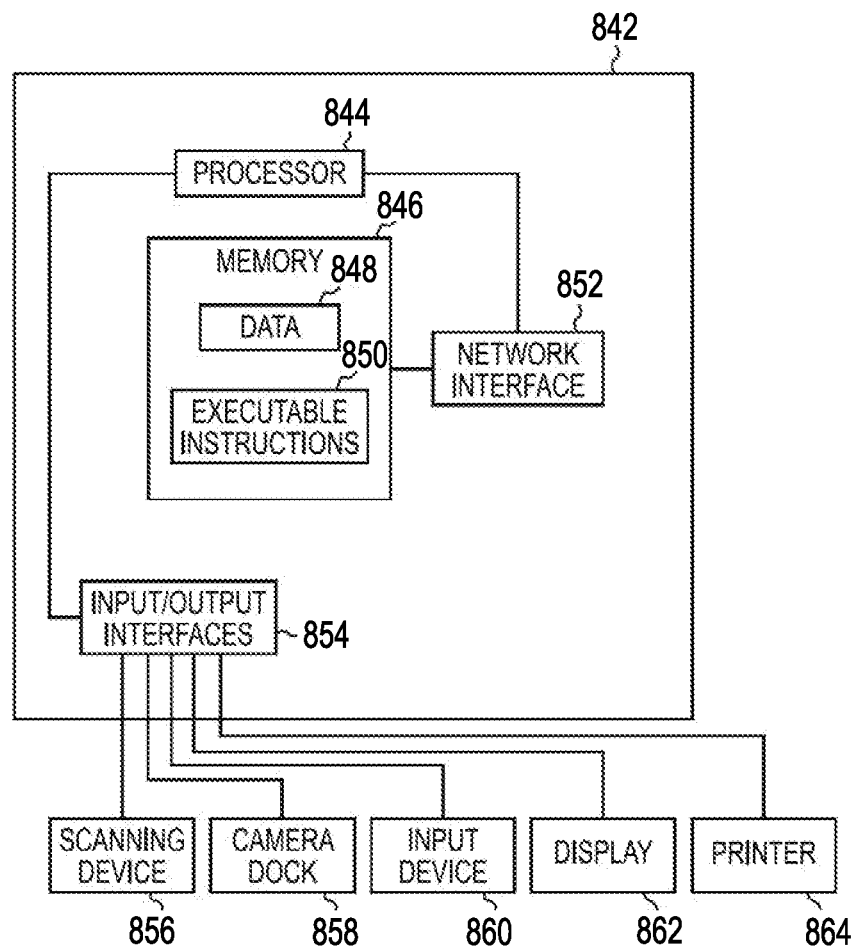
FIG. 8 illustrates a computing device that can be utilized according to one or more embodiments of the present disclosure.

FIG. 8 illustrates a computing device that can be utilized according to one or more embodiments of the present disclosure. For instance, a computing device 842 can have a number of components coupled thereto.

The computing device 842 can include a processor 844 and a memory 846. The memory 846 can have various types of information including data 848 and executable instructions 850, as discussed herein.

The processor 844 can execute instructions 850 that are stored on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory 846 and/or the processor 844 may be located on the computing device 842 or off of the computing device 842, in some embodiments. As such, as illustrated in the embodiment of FIG. 8, the computing device 842 can include a network interface 852. Such an interface 852 can allow for processing on another networked computing device, can be used to obtain information about the patient, and/or can be used to obtain data and/or executable instructions for use with various embodiments provided herein.

As illustrated in the embodiment of FIG. 8, the computing device 842 can include one or more input and/or output interfaces 854. Such interfaces 854 can be used to connect the computing device 842 with one or more input and/or output devices 856, 858, 860, 862, 864.

For example, in the embodiment illustrated in FIG. 8, the input and/or output devices can include a scanning device 856, a camera dock 858, an input device 860 (e.g., a mouse, a keyboard, etc.), a display device 862 (e.g., a monitor), a printer 864, and/or one or more other input devices. The input/output interfaces 854 can receive executable instructions and/or data, storable in the data storage device (e.g., memory), representing a virtual dental model of a patient's dentition.

In some embodiments, the scanning device 856 can be configured to scan one or more physical dental molds of a patient's dentition. In one or more embodiments, the scanning device 856 can be configured to scan the patient's dentition, a dental appliance, and/or attachment placement structure directly. The scanning device 856 can be configured to input data into the computing device 842.

In some embodiments, the camera dock 858 can receive an input from an imaging device (e.g., a 2D or 3D imaging device) such as a digital camera, a printed photograph scanner, and/or other suitable imaging device. The input from the imaging device can, for example, be stored in memory 846.

The processor 844 can execute instructions to provide a visual indication of a treatment plan, a dental appliance, and/or a one or more attachments on the display 862. The computing device 842 can be configured to allow a treatment professional or other user to input treatment goals. Input received can be sent to the processor 844 as data 848 and/or can be stored in memory 846.

Such connectivity can allow for the input and/or output of data and/or instructions among other types of information. Some embodiments may be distributed among various computing devices within one or more networks, and such systems as illustrated in FIG. 8 can be beneficial in allowing for the capture, calculation, and/or analysis of information discussed herein.

The processor 844, in association with the data storage device (e.g., memory 846), can be associated with the data 848. The processor 844, in association with the memory 846, can store and/or utilize data 848 and/or execute instructions 850 for creating and/or modeling interactions between an attachment and a tooth; interactions between an attachment and an appliance; and/or combinations of interactions between one or more attachments, one or more teeth and/or other structure in the mouth of the patient, and/or one or more appliances for moving teeth.

The processor 844, in association with the memory 846 can, in addition to or alternatively, store and/or utilize data 848 and/or execute instructions 850 for creating and/or modeling attachment placement structures and/or attachments, and/or adhesive and/or releasable materials, as well as a virtual modeling of such items with or without an appliance for moving teeth, and/or one or more teeth. The virtual model of the attachment placement structure and/or attachments to attach a dental appliance to the teeth of a patient can be used to create a physical dental appliance, attachment placement structure and/or attachments, for instance, as discussed further herein.

The processor 844 coupled to the memory 846 can, for example, include instructions to cause the computing device 842 to perform a method including, for example, creating a treatment plan based on a virtual model of a jaw of a patient, wherein the treatment plan includes use of an attachment.

In some embodiments, the processor 844 coupled to the memory 846 can cause the computing device 842 to perform the method comprising modeling a virtual dental attachment based on the treatment plan, wherein the virtual dental attachment is constructed to provide one or more forces desired by the treatment plan.

In various embodiments, the processor 844 coupled to the memory 846 can cause the computing device 842 to perform the method comprising creating a virtual dental attachment placement apparatus that includes a body having an attachment mounting structure and including a surface having a contour that is shaped to correspond with a contour of an alignment surface of a tooth such that when the contour of the body and the corresponding contour of the tooth are aligned, the dental attachment is placed in the attachment mounting structure, the dental attachment is located at a particular position with respect to an exterior surface of the tooth.

Such analysis can be accomplished one or more times for a treatment plan. For example, if a treatment plan has 30 stages, it would be possible to have different attachments for each stage or possibly more, if desired. However, in many instances the attachment type, position, and/or orientation may be changed a few times during the treatment plan.

Through use of virtual modeling, attachments can be virtually tested and the best attachment type, shape, position, and/or orientation can be selected without inconveniencing the patient with trial and error of attachments during treatment. Additionally, use of virtual modeling can also allow for custom design of attachment shapes that will be suitable for a specific patient's needs and/or a specific function within an area of a patient's mouth. From such analysis, different physical dental attachment placement apparatuses can be created from the virtual dental attachment placement apparatus data that would be utilized to create the attachments needed for the different stages.

Further, the specialized nature of the design of such attachments can also allow the attachments to be made from different materials. In this manner, attachments during a treatment plan or even during one stage can be of a different material that may provide more specialized force distribution than was possible with standard attachments.

In some embodiments, the printer 844 can be a three dimensional or direct fabrication device that can create a dental appliance directly from instructions from the computing device 842. Embodiments of the present disclosure utilizing such technology can be particularly beneficial for a variety of reasons. For example, such direct manufacture allows for less waste of materials due to less processing steps and increased specialization of the attachment placement structure, attachment materials, and/or other components of the appliances described herein.

In some embodiments, the attachment placement structure can be formed and one or more attachments formed with the attachment placement structure. Such technologies can be particularly useful in some such embodiments as the two can be fabricated during the same process.

The embodiments of the present disclosure can provide a number of benefits. For example, the embodiments can save time and cost in manufacture, improve the accuracy of the type of attachment material used, the preparation of the material, formation of the attachments, the positioning and/or orientation of the placement of the attachments, allow more ability to create specialized attachment sizes and shapes, and can save time and improve the experience of the patient and/or treatment professional in creating and/or securing attachments, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An attachment placement apparatus comprising:
a three-dimensional (3D) printed body shaped to engage with a patient's dentition, wherein the 3D printed body comprises:
a plurality of 3D printed aligner attachments, that, when worn at specified locations on the patient's dentition, engage with one or more aligners to direct repositioning forces from the one or more aligners to the patient's dentition, wherein each of the plurality of 3D printed aligner attachments is entirely within a corresponding aperture of the apparatus; and
a plurality of 3D printed contoured surfaces shaped in accordance with corresponding surfaces of the patient's teeth, the plurality of 3D printed contoured surfaces arranged to place the 3D printed aligner attachments at a corresponding plurality of locations on the patient's dentition; and
a plurality of 3D printed supports extending from the 3D printed body and coupled to each of the 3D printed aligner attachments, wherein the plurality of 3D printed supports comprise breakable regions to facilitate removal of the 3D printed aligner attachments from the 3D printed body, wherein, for each 3D printed aligner attachment, corresponding 3D printed supports support the corresponding 3D printed aligner attachment within the corresponding aperture.

2. The apparatus of claim 1, wherein the 3D printed body is made of a polymer.

3. The apparatus of claim 1, wherein the 3D printed body is formed from a single 3D print process.

4. The apparatus of claim 1, wherein the 3D printed aligner attachments include affixing surfaces and exterior surfaces opposite the affixing surfaces, wherein the exterior surface of at least one attachment of the plurality of 3D printed aligner attachments includes a flat surface.

5. The apparatus of claim 1, wherein at least one support of the plurality of 3D printed supports has a tapered width.

6. The apparatus of claim 1, wherein the plurality of 3D printed contoured surfaces are configured to retain the 3D printed body to the patient's dentition.

7. The apparatus of claim 1, wherein the 3D printed body is shaped to engage with the patient's upper jaw.

8. The apparatus of claim 1, wherein the 3D printed body is shaped to engage with the patient's lower jaw.

9. The apparatus of claim 1, wherein the plurality of 3D printed aligner attachments are retention attachments configured to retain the one or more aligners to the patient's teeth.

10. The apparatus of claim 1, wherein the plurality of 3D printed aligner attachments are made from the same material as the plurality of 3D printed contoured surfaces and the plurality of 3D printed supports.

11. The apparatus of claim 1, wherein the plurality of 3D printed aligner attachments are made from a different material from the plurality of 3D printed contoured surfaces and the plurality of 3D printed supports.

12. The apparatus of claim 1, wherein the plurality of 3D printed aligner attachments are shaped to engage with a plurality of aligners for a plurality of stages of a treatment plan.

13. The apparatus of claim 1, wherein the contoured surfaces are configured to engage with bottom edges of teeth of the patient's dentition.

14. The apparatus of claim 1, wherein, for each 3D printed aligner attachment, the corresponding 3D printed supports extend radially around the corresponding 3D printed attachment.

15. The apparatus of claim 1, wherein each of the 3D printed aligner attachments is attached to at least three corresponding 3D printed supports.

16. The apparatus of claim 1, wherein each of the plurality of 3D printed attachments includes an aligner engagement surface that is configured to engage with the one or more aligners, wherein when the contoured surfaces of the placement apparatus are placed on corresponding surfaces of the patient's teeth, at least two of the aligner engagement surfaces of the plurality of aligner attachments are oriented in different directions with respect to the 3D printed body.

17. A system comprising:
an attachment placement apparatus comprising:
a three-dimensional (3D) printed body shaped to engage with a patient's dentition, wherein the 3D printed body comprises:
a plurality of 3D printed aligner attachments, wherein each of the plurality of 3D printed aligner attachments is entirely within a corresponding aperture of the apparatus; and
a plurality of 3D printed contoured surfaces shaped in accordance with corresponding surfaces of the patient's teeth, the plurality of 3D printed contoured surfaces arranged to place the 3D printed aligner attachments at a corresponding plurality of locations on the patient's dentition;
a plurality of 3D printed supports extending from the 3D printed body and coupled to each of the 3D printed aligner attachments, wherein the plurality of 3D printed supports comprise breakable regions to facilitate removal of the 3D printed body, wherein, for each 3D printed aligner attachment, corresponding 3D printed supports support the corresponding 3D printed aligner attachment within the corresponding aperture; and
a set of aligners configured to be worn serially on the patient's dentition to resiliently reposition teeth of the patient's dentition according to a treatment plan, wherein at least one aligner of the set of aligners, when worn, is shaped to engage with at least one attachment of the plurality of 3D printed aligner attachments attached to the patient's dentition and direct repositioning forces to the patient's dentition.

18. The system of claim 17, wherein the set of aligners are made of polymer material.

19. The system of claim 17, wherein the at least one attachment includes a first attachment and a second attachment, and wherein the at least one aligner of the set of aligners, when worn, is shaped to engage with the first attachment and the second attachment attached to the patient's dentition.

20. The system of claim 19, wherein the 3D printed body is configured to arrange the first attachment and the second attachment with respect to the patient's dentition such that the at least one aligner of the set of aligners provides a force distribution in accordance with a stage of the treatment plan when the first attachment and the second attachment engage with the at least one aligner of the set of aligners.

21. The system of claim 17, wherein the set of aligners are thermoformed dental appliances.

22. The system of claim 17, wherein the aligners are 3D printed dental appliances.

\* \* \* \* \*